United States Patent [19]

McCormick

[11] Patent Number: 5,893,082

[45] Date of Patent: Apr. 6, 1999

[54] SYSTEM FOR PROCESSING AND PRESENTING COST ESTIMATES IN THE CONSTRUCTION INDUSTRY

[76] Inventor: John M. McCormick, 821 W. Fairway, Chandler, Ariz. 85224

[21] Appl. No.: 771,669

[22] Filed: Dec. 23, 1996

[51] Int. Cl.[6] .................................................. G06F 17/50
[52] U.S. Cl. ........................ 705/400; 345/115; 345/340; 345/346; 364/512
[58] Field of Search ................................. 345/115, 118, 345/340, 345, 346, 964; 364/400, 512, 560; 705/1, 29, 400; 707/502; 702/155

[56] References Cited

U.S. PATENT DOCUMENTS 5,442,380  8/1995  McCormick ............................ 377/1 X
5,539,869  7/1996  Spoto et al. .............................. 345/336

Primary Examiner—Edward R. Cosimano
Attorney, Agent, or Firm—John D. Lister

[57] ABSTRACT

A computer system for processing and presenting cost estimates in the construction industry includes a CPU; primary input hardware for entering data and commands to the CPU; output hardware including a display for displaying information; estimating hardware for interacting with a plan print to count and/or scale off measurements of assemblies and/or items on the plan print and input such counts and/or measurements into the CPU for processing; and a memory unit having a stored assembly information record list database and a stored item information record list database and including software means for permitting an operator to command, through the primary input hardware, an opening for concurrent use of any selected number of takeoff windows from the assembly and/or item information record lists; a closing of any open takeoff window; an opening of any additional takeoff window; and a count and/or scaling off of measurements of assemblies and/or items from a plan print with the estimating hardware for cost estimating purposes.

11 Claims, 2 Drawing Sheets

SYSTEM FOR PROCESSING AND PRESENTING COST ESTIMATES IN THE CONSTRUCTION INDUSTRY

BACKGROUND OF THE INVENTION

The present invention is directed to a computer system for processing and presenting cost estimates in the construction industry and in particular, to a computer system which enables the operator to simultaneously bring up a plurality of assembly list and/or item list takeoff windows; display such takeoff windows on the system display screen; and count and/or perform measurements relating to the assemblies and/or items included on any of the takeoff windows which have been brought up.

As used herein, the term "construction materials" means electrical; plumbing; telephonic; insulating; heating, ventilating and air conditioning; windows; doors; flooring; roofing; siding; and other construction materials such as structural construction materials. As used herein, the term "assembly database" means a construction material database which includes a construction material assembly list or file of records composed of fields containing data items (e.g. assembly number, assembly name, assembly cost, assembly installation cost, etc.). As used herein, the term "item database" means a construction material database which includes a construction material item or component list or file of records composed of fields containing data items (e.g. item or component number, item or component name, item or component cost, item or component installation cost, etc.). The construction materials of the assembly database and the item database are related in that the items or components listed in the item database may be items or components of assemblies listed in the assembly database as well as stand alone items or components not included in an assembly listed in the assembly database.

Previous computer systems available in the construction industry have included assembly databases and item databases. One such computer system permits the operator or estimator to bring up one takeoff window at a time from either the assembly database or the item database; display the takeoff window on the display screen of the computer system; and count and/or make measurements (such as length) relating to the assemblies or items appearing on that single takeoff window through the use of input hardware interacting with a print plan. If the estimator desires to count and/or measure assemblies or items appearing elsewhere on the database list from which the takeoff window was selected or to change from an assembly count or measurement to an item count or measurement or vise-versa, the takeoff window then being displayed (e.g. a first takeoff window) must be replaced with a new takeoff window (e.g. a second takeoff window). If the estimator later discovers that he/she has miss counted or measured an assembly or item being counted or measured in the first takeoff window, the estimator must replace the second takeoff window with the first takeoff window before the estimator can go back and change the count or measurement of the assembly or item contained in the first takeoff window. These assembly and item lists frequently have tens of thousands of assemblies or items listed and can exceed one hundred thousand assemblies or items. Accordingly, the task of estimating construction costs with a computer system that permits the estimator to work with only one takeoff window at any given time can become quite awkward and time consuming.

A second computer system used for cost estimating purposes in the construction industry permits the operator or estimator to simultaneously bring up three takeoff windows on the display screen. While this system simplified and streamlined the task of cost estimating from print plans using a computer system, the estimator is still restricted to three takeoff windows and only three takeoff windows at any given time. The estimator can not use a different number of takeoff windows in his cost estimating effort. Accordingly, there has been a need to provide a cost estimating computer system and method which provides the estimator greatly increased flexibility by permitting the estimator to bring up or open at any given time any number of takeoff windows from one or more databases; to count and/or measure assemblies or items on any of the takeoff windows that have been brought up or opened; to bring up or open one or more additional takeoff windows at any time during the estimating process without having to close down any of the other takeoff windows currently being used to perform the estimate; and to close one or more selected takeoff windows while performing a cost estimate without having to close the other takeoff windows currently being used to perform the estimate.

SUMMARY OF THE INVENTION

The present invention provides a unique and useful computer system and method for processing and presenting cost estimates in the construction industry which provides a solution to the above discussed needs. The computer system of the present invention normally includes a central processing unit; primary input hardware for entering commands into the central processing unit and data into the databases; output hardware including a display screen for displaying information, a printer for making a hard copy of estimates and/or a modem; estimating hardware including an estimating tool or tools for interacting with a print plan to count and/or measure assemblies and items on the plan print and input such count and/or measurements into the central processing unit; and a memory unit.

The memory unit includes at least one assembly database of stored assembly information and at least one item database of stored item information. The information record lists in these databases frequently contain tens of thousands of data items. The memory unit also includes WINDOWS 3.1 software and other software for permitting an operator to bring up or open at any one time any selected number of takeoff windows from the assembly database and/or the item database for use in the estimating process then being performed; to display such takeoff windows on the display screen; and to count and/or perform measurements with the estimating tool(s) relative to any assembly or item appearing in any of the takeoff windows currently opened; to record such count and/or measurement for cost estimating purposes; and to record an estimate based on such count(s) and/or measurement(s). The number of takeoff windows which can be utilized by the system at any one time is limited only by the capacity of the hardware. In addition, the estimator may bring up or open one or more additional takeoff windows at any time during the estimating process without having to close down any of the other takeoff windows currently being used to perform the estimate and may close one or more selected takeoff windows while performing a cost estimate without having to close the other takeoff windows currently being used to perform the estimate.

DESCRIPTION OF THE PREFERRED EMBODIMENTS

Figure 1:
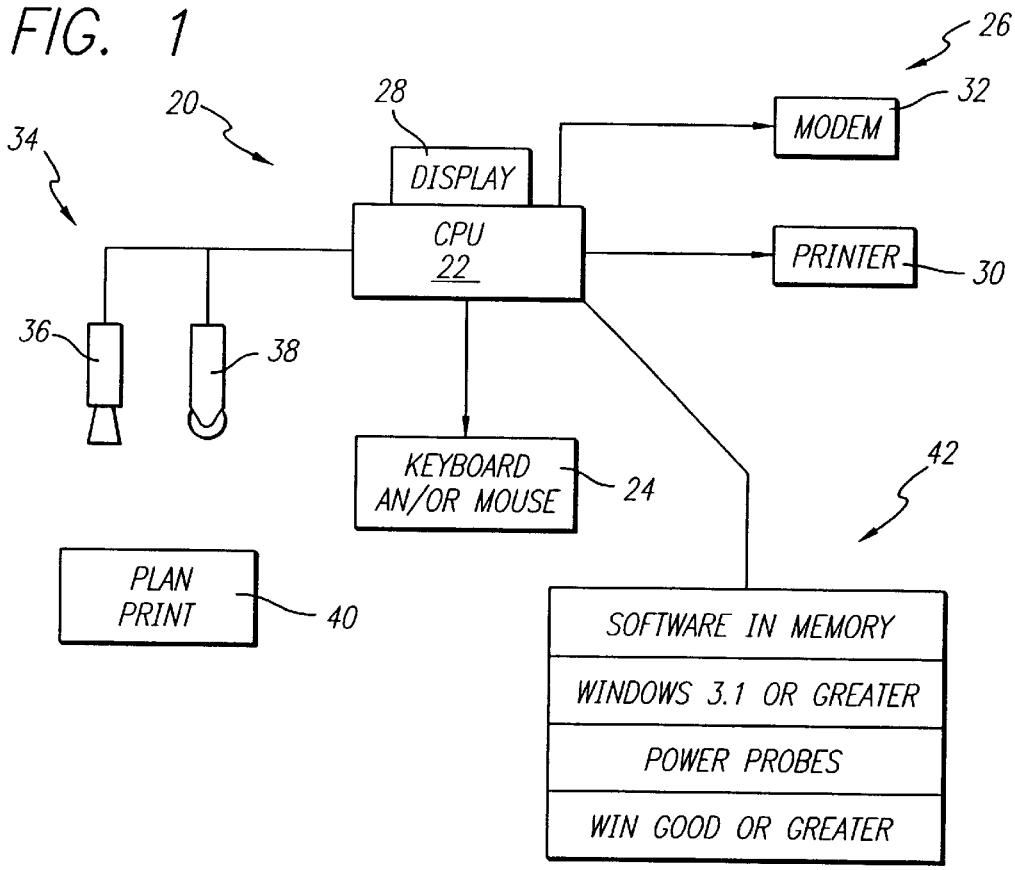
FIG. 1 is a schematic diagram illustrating the computer system of the present invention.

As shown in FIG. 1 the computer system 20 of the present invention for processing and presenting cost estimates in the construction industry includes a central processing unit (CPU) 22; primary input hardware 24 which typically includes both a keyboard and a mouse for entering data and commands into the CPU; output hardware 26 including a display such as a monitor screen 28 for displaying take-off windows and the like and, typically, a printer 30 for providing a hard copy of the estimate(s) and/or a modem 32 for transferring the estimate(s) to another computer, display device or off site printer; estimating hardware 34, such as a counting pen 36, a scaling probe 38, or other estimating tools for interacting with a plan print 40, to count assemblies and/or items and/or scale off measurements such as the lengths of assemblies and/or items on the plan print 40 and entering such counts and/or measurements into the CPU 22 for processing; and a memory unit 42. Through the use of this computer system 20 an operator or estimator can easily, efficiently and accurately make cost estimates from a plan print relating to various construction projects and various aspects of those construction projects, such as but not limited to, electrical costs, plumbing costs, heating ventilating and air conditioning costs, insulation costs, labor costs, overall costs, etc.

The computer system 20 and method of the present invention preferably utilize an IBM PC or equivalent hardware (e.g. 16 bit or 32 bit platforms) that operates under WINDOWS 3.1 software or greater. The computer system 20 preferably includes an Intel PENTIUM 586 processor or compatible computer with a one gigabit hard drive, 16 Mb of RAM, and a VGA display.

Preferably, the central processing unit 22 of the computer system 20 is connected to the direct entry estimating hardware such as tools 36 and/or 38. An example of a direct entry counting tool 36 that can be used in the computer system 20 for counting assemblies and/or items on a plan print 40 is the direct entry marking and counting tool disclosed in the U.S. patent to McCormick (U.S. Pat. No. 5,442,380) and available from McCormick Systems, Inc., of Mesa, Ariz. under the trademark "POWER PROBES". The entire disclosure of U.S. Pat. No. 5,442,380 is hereby incorporated herein by reference. An example of a direct entry scaling tool 38 that can be used in the computer system 20 for scaling the lengths of assemblies and/or items from a plan print is the McCormick Length Probe, which is also available from McCormick Systems, Inc. of Mesa, Ariz. While these direct entry estimating tools are preferred, it is to be understood that other estimating hardware can be used with the computer system 20 and that the estimating tools are not limited to the POWER PROBES counting tool and the McCormick Length Probe.

Preferably, the primary input hardware 24 of the computer system 20 for entering data and commands into the CPU includes both a conventional keyboard and conventional mouse. The output hardware 26 of the computer system includes a conventional display such as a monitor 28 and preferably, a conventional printer 30 for obtaining a printed copy of the cost estimate produced by the computer system 20 and method of the present invention and/or a modem 32 for transferring estimate information to another off site computer, etc.

The software of the computer system 20 preferably includes the following commercially available application software or its equivalent: WINDOWS 3.1 software or greater software available from Microsoft; POWER PROBES software available from McCormick Systems, Inc.; and WIN 6000 or WIN 8000 software available from McCormick Systems, Inc. The WINDOWS 3.1 software or greater software environment allows multiple software packages to run concurrently and communicate between themselves. Communication between the software packages leverages the software packages functionally into an integrated solution and minimizes software development.

Figure 2:
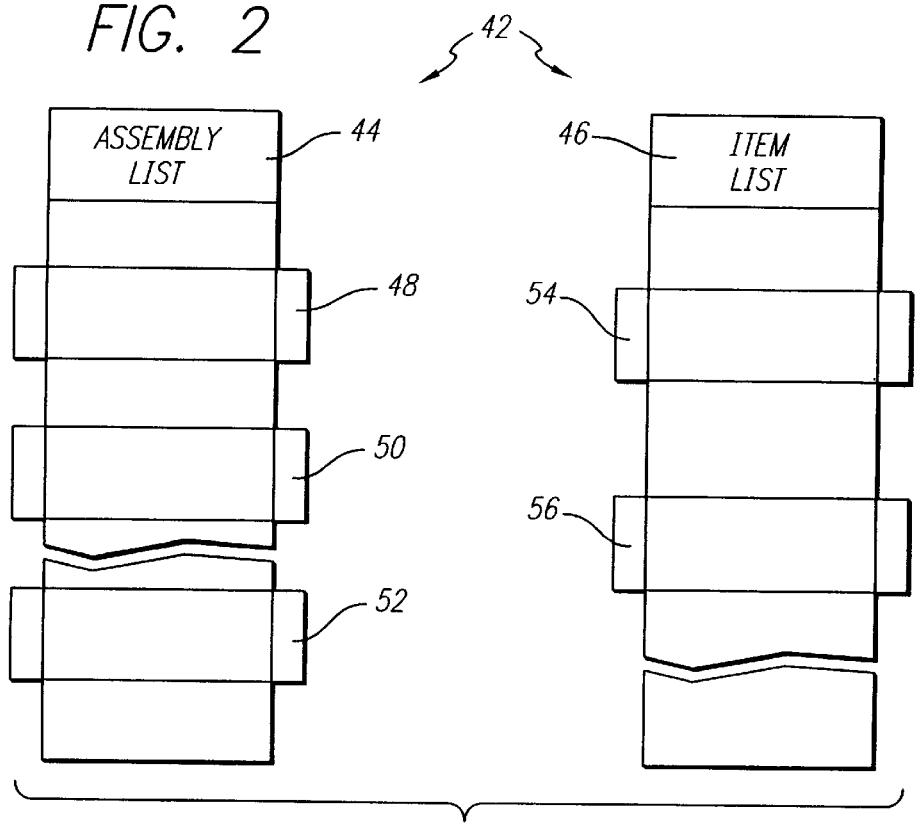
FIG. 2 is a schematic representation of the assembly list of an assembly database and the item list of an item database stored in the memory of the computer system of the present invention and showing takeoff windows which appear in FIG. 3.

As schematically shown in FIG. 2, the memory unit 42 of the computer system 20 includes at least one assembly database 44 and at least one item database 46 related to the assembly database 44. In addition, the memory unit 42 may include other pairs of assembly databases and related item databases not shown in FIG. 2. The assembly database 44 includes an assembly information record list and the item database 46 includes an item information record list related to the assembly information record list of the assembly database 44.

Preferably, the assembly record information list of the assembly database 44 contains a numerical listing of the potential assemblies which can be used on a construction project, e.g. electrical, plumbing, heating ventilating and air conditioning, insulation, telephone, etc., along with additional information relating to the cost of the assemblies and the cost of installing such assemblies. The related item record list of the item database 46 contains listings or breakdowns of the components utilized in or alternate components which can be used in the various assemblies set forth in the assembly record information list of the assembly database 44 along with related cost information. The item record information list can also include items or components which can be used alone and not as part of an assembly set forth in the assembly record information list.

With the information contained in the assembly database 44 and the item database 46, an estimator using the method of the present invention can estimate the construction costs related to a selected construction project in total or in part e.g. breaking out the estimated costs for particular segments of the construction project, such as electrical or plumbing. The method of the present invention also permits the estimator to select and estimate the costs, including installation costs, of various assemblies and items or components for each construction segment as well as alternative assemblies and items or components for a selected construction project or segment.

Using the software architecture and method of the present invention, an estimator logs into the computer system 20 and brings up the takeoff menu for the assembly database 44 and/or the item database 46. The estimator then selects any desired number of takeoff windows relating to the assembly record information list of the assembly database 44 and/or the item record information list of the item database 46 and opens the selected takeoff windows for use in cost estimating purposes. The assembly takeoff windows relating to the assembly database 44 include the assemblies which the estimator intends to use in making his estimate whether for an entire construction project or a portion of a construction project. The assemblies contained in each assembly takeoff window are typically selected by name or assembly number. The item takeoff windows relating to the item database 46 include items or components which the estimator intends to use in making his/her estimate for an entire construction project or a portion of the construction project. The items or components contained in each item takeoff window are also typically selected by name or item number.

The selected takeoff windows (one or more assembly and/or item takeoff windows for use in estimating the construction costs of a construction project or a portion of a construction project) are normally brought up on the display screen 28 of the computer system 20. The individual takeoff windows can vary in length and number of entries (assemblies or items) being displayed. The number of takeoff windows fully displayed on the display screen at any one time is only limited by the size of the display screen. Typically, about four to about six takeoff windows will fill the display screen. However, the takeoff windows can be displayed with certain of the windows overlapping other of the takeoff windows in whole or in part and any number of selected takeoff windows may be used at any one time to perform an estimate with the number of takeoff windows being used limited only by the capacity of the computer system 20.

Figure 3:
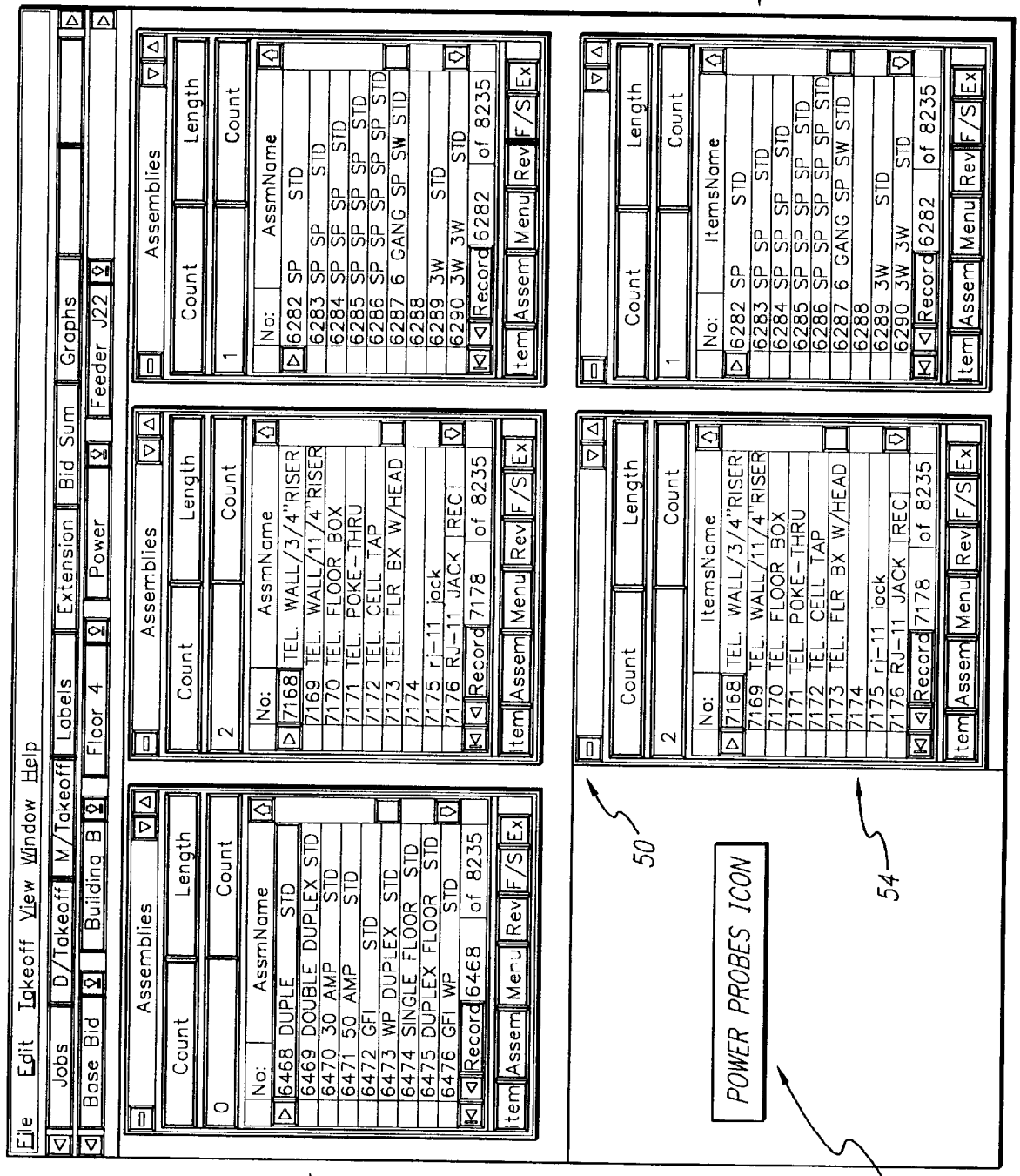
FIG. 3 is a schematic representation of a display screen of the computer system of the present invention displaying three assembly takeoff windows and two item takeoff windows.

For illustrative purposes FIG. 3 shows one layout of takeoff windows on the display screen 28. As shown, the display screen of FIG. 3 is displaying three assembly takeoff windows 48, 50, and 52 from the assembly list of the assembly database 44 and two item takeoff windows 54 and 56 from the item list of the item database 46 of FIG. 2, as well as the Power Probes icon 58 which indicates that the estimating hardware e.g. the count pen 36 and the scaling probe 38 are operable and connected to the CPU 22 for use through interaction with the print plan 40 in making counting and scaling entries into the computer system 20 for processing.

The estimator using the estimating hardware for direct interaction with the plan print or the keyboard for a visual interaction with the plan print can enter a count or scale a measurement relating to any of the assemblies or items in any of the takeoff windows then open (whether displayed on the screen or overlapped) and can go back and forth between the open takeoff windows while making the counts and/or measurements. The ability to go back and forth between numerous takeoff windows is especially useful when the estimator believes he/she has finished the count or measurements relating to a particular assembly or item in one of the takeoff windows and moved on to count or measure a different assembly or item in another takeoff window only to realize that he/she has miss counted or measured an assembly or item in one of the previously used takeoff windows. The estimator merely goes back to the previously used takeoff window with the particular assembly or item that needs to be included in the previous count and/or measurement and enters the additional count with the estimating hardware or through the use of the keyboard.

When the estimator is through with the count or measurements relating to a particular assembly or item or a number of assemblies or items, the takeoff window containing the particular assembly or item or the takeoff windows containing these particular assemblies or items can be closed without closing any of the other takeoff windows then open. Likewise, if the estimator desires to bring up or open an additional takeoff window or windows from the assembly database to count or measure an assembly or assemblies contained in these takeoff windows and/or to bring up or open an additional takeoff window or windows from the item database to count or measure an item or items contained in these takeoff windows, he/she may do so without closing any of the other takeoff windows currently open. Thus, the computer system 20 and method for estimating construction costs is quite versatile, efficient and easy to use.

Once entered into the computer system 20, the count(s) and/or measurements are processed to provide various estimates relating to a construction project, such as but not limited to: the number or numbers of a particular assembly or assemblies or a particular item or items required for the construction project; the costs of such assembly or assemblies and/or item or items; the associated labor costs; etc. The estimate is stored in the memory, and can be printed or transferred to another computer, etc. through the use of a modem, floppy disks, or other conventional computer communication means.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A computer system for processing and presenting cost estimates in the construction industry comprising:

a central processing unit; primary input hardware means for entering data and commands to the central processing unit; output hardware including a display for displaying information; estimating hardware means for interacting with a plan print to count and/or scale off measurements of assemblies and/or items on the plan print and input such count and/or scale off measurements into the central processing unit for processing; and a memory means having a stored assembly information record list database and stored item information record list database; the memory means including software means, responsive to commands through the primary input hardware means, capable of opening, for concurrent use, two, three or more takeoff windows from the assembly information record list and/or the item information record list, for counting and/or scaling off measurements of any of the assemblies and/or items of any of the opened takeoff windows with the estimating hardware for cost estimating purposes and capable of closing any of the opened takeoff windows without closing any of the other opened takeoff windows and opening another takeoff window without closing any of the other opened takeoff windows.

2. The computer system of claim 1, wherein: the software means is capable of opening, for concurrent use, six or more takeoff windows from the assembly information records list and/or the item information record lists, for counting and/or scaling off measurements of any of the assemblies and/or items of any of the opened takeoff windows with the estimating hardware for cost estimating purposes.

3. The computer system of claim 1, wherein: the estimating hardware includes a count tool means and a scaling tool means.

4. The computer system of claim 1, wherein: the software means is capable of opening, for concurrent use, four or more takeoff windows, from the assembly information records list and/or the item information record lists, for counting and/or scaling off measurements of any of the assemblies and/or items of any of the opened takeoff windows with the estimating hardware for cost estimating purposes.

5. A method of processing and presenting cost estimates in the construction industry comprising:

providing a central processing unit; primary input hardware means for entering data and commands to the central processing unit; output hardware including a display for displaying information; estimating hardware means for interacting with a plan print to count and/or scale off measurements of assemblies and/or items on the plan print and input such count and/or scale off measurements into the central processing unit for processing; and a memory means having a stored assembly information record list database and a stored item information record list database; the memory means including software means, responsive to commands through the primary input hardware means, capable of opening, for concurrent use, two, three or more takeoff windows, from the assembly information record list and/or the item information record list, for counting and/or scaling off measurements of any of the assemblies and/or items of any of the opened takeoff windows with the estimating hardware for cost estimating purposes and capable of closing any of the opened takeoff windows without closing any of the other opened takeoff windows and opening another takeoff window without closing any of the other opened takeoff windows;

entering commands to the central processing unit through the primary input hardware to open a selected number of selected takeoff windows; and effecting a count of and/or scaling off of measurements of assemblies and/or items of any open takeoff window.

6. The method of claim 5, including: entering the count into the central processing unit through the use of the primary input hardware means.

7. The method of claim 5, the software means is capable of opening, for concurrent use, six or more takeoff windows from the assembly information record list and/or the item information record list, and initially opening up six takeoff windows.

8. The method of claim 5, including: initially opening three takeoff windows.

9. The method of claim 8, including: using the estimating hardware to perform the count and/or scale off measurements from the plan print.

10. The method of claim 8, wherein: the software means is capable of opening, for concurrent use, four or more takeoff windows from the assembly information record list and/or the item information record list, and initially opening up four takeoff windows.

11. The method of claim 10, including: using the estimating hardware to perform the count and/or scale off measurements from the plan print.

* * * * *